US008629757B2

(12) United States Patent
Shimizu et al.

(10) Patent No.: US 8,629,757 B2
(45) Date of Patent: Jan. 14, 2014

(54) PROCESSING SYSTEM FOR PORTABLE ELECTRONIC APPARATUS, PORTABLE ELECTRONIC APPARATUS, AND PROCESSING APPARATUS FOR PORTABLE ELECTRONIC APPARATUS

(75) Inventors: Hiroo Shimizu, Yokohama (JP); Kiyohito Sudo, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 217 days.

(21) Appl. No.: 12/725,624

(22) Filed: Mar. 17, 2010

(65) Prior Publication Data
US 2011/0012714 A1 Jan. 20, 2011

(30) Foreign Application Priority Data
Jul. 16, 2009 (JP) ................................ 2009-167892

(51) Int. Cl.
*H04Q 5/22* (2006.01)
*G05B 19/00* (2006.01)
*G05B 23/00* (2006.01)
*G06K 5/00* (2006.01)
*H04J 3/06* (2006.01)
*H04L 7/04* (2006.01)

(52) U.S. Cl.
USPC ............. 340/5.6; 340/5.2; 340/10.4; 340/5.4; 235/380; 370/518; 375/362

(58) Field of Classification Search
USPC ......................................... 710/16, 5; 370/408
See application file for complete search history.

(56) References Cited

U.S. PATENT DOCUMENTS 5,680,585 A * 10/1997 Bruell ............................. 703/26
5,790,885 A * 8/1998 Shona ................................ 710/5

(Continued)

FOREIGN PATENT DOCUMENTS

| JP | 2003-29872 | 1/2003 |
| JP | 3607229 | 10/2004 |
| KR | 2004-0069879 | 8/2004 |
| WO | WO 2007/099339 | 9/2007 |

OTHER PUBLICATIONS

ISO/IEC 14443-3 Part 3: Initialization and Anticollision. Jun. 11, 1999.*
European Search Report dated Oct. 28, 2010.

(Continued)

*Primary Examiner* — Steven Lim
*Assistant Examiner* — Pameshanand Mahase
(74) *Attorney, Agent, or Firm* — Pillsbury Winthrop Shaw Pittman, LLP (57) ABSTRACT

A portable electronic apparatus has a first storage section configured to store information to be communicated to the processing apparatus and formats for a frame to be transmitted to the processing apparatus, in association with one another. The processing apparatus has a second storage section configured to store information communicated by the portable electronic apparatus and the format of the frame transmitted by the portable electronic apparatus, in association with each other. The portable electronic apparatus select one of the formats stored in the first storage section based on the data to be transmitted to the processing apparatus. The processing apparatus recognize information communicated by the portable electronic apparatus based on the format of the frame received from the portable electronic apparatus.

5 Claims, 4 Drawing Sheets

(56) References Cited

U.S. PATENT DOCUMENTS

| | | | |
|---|---|---|---|
| 6,678,753 B1* | 1/2004 | Tanaka | 710/16 |
| 7,061,399 B2* | 6/2006 | Leck | 340/870.06 |
| 7,705,712 B2* | 4/2010 | Kelly et al. | 340/10.1 |
| 2001/0030976 A1 | 10/2001 | Turner | |
| 2006/0027644 A1* | 2/2006 | Takashi et al. | 235/380 |
| 2008/0063003 A1* | 3/2008 | O'Neal | 370/408 |
| 2008/0074276 A1* | 3/2008 | Valencia et al. | 340/635 |
| 2009/0240978 A1 | 9/2009 | Sudo | |

OTHER PUBLICATIONS

Singapore Search Report dated Mar. 25, 2011.

* cited by examiner

(A) { If TR1 is at most 100/fs, validation information is present
     { If TR1 exceeds 100/fs, no validation information is present (B) { If logical 0 interval of SOF is between 10 etu and 10.5 etu,
     { type of validation information is hash value
     { If logical 0 interval of SOF is between 10.5 etu and 11 etu,
     { type of validation information is CRC (C) { If logical 0 interval of EOF is between 10 etu and 10.5 etu,
     { validation information is present
     { If logical 0 interval of SOF is between 10.5 etu and 11 etu,
     { no validation information is present (D) { If EGT period is between 0 etu and 1 etu,
     { validation information is present
     { If EGT period is between 1 etu and 2 etu,
     { no validation information is present

11b, 28b (A) { If TR1 includes no modulation interval, no error is present
     { If modulation interval in TR1 is between 1 etu and 1 etu, error is present (B) { If encoding scheme is NRZ encoding, no error is present
     { If encoding scheme is Manchester encoding, error is present (C) { If frequency of TR1 is 6.78 MHz, CRC error has occurred
     { If frequency of TR1 is 3.39 MHz, EDC error has occurred
     { If frequency of TR1 is 1.695 MHz, parity error has occurred

FIG. 12

PROCESSING SYSTEM FOR PORTABLE ELECTRONIC APPARATUS, PORTABLE ELECTRONIC APPARATUS, AND PROCESSING APPARATUS FOR PORTABLE ELECTRONIC APPARATUS

CROSS-REFERENCE TO RELATED APPLICATIONS

This application is based upon and claims the benefit of priority from prior Japanese Patent Application No. 2009-167892, filed Jul. 16, 2009, the entire contents of which are incorporated herein by reference.

BACKGROUND OF THE INVENTION

1. Field of the Invention

The present invention relates to, for example, a processing system for a portable electronic apparatus, the portable electronic apparatus, and a processing apparatus for the portable electronic apparatus all of which achieve various types of processing by transmitting and receiving commands.

2. Description of the Related Art

In general, an IC card used as a portable electronic apparatus includes a card-like main body formed of plastic or the like and an IC module embedded in the main body. The IC module includes an IC chip. The IC chip comprises a non-volatile memory such as EEPROM (Electrically Erasable Programmable Read-Only Memory) or a flash ROM which can hold data even without a power supply, and CPU configured to perform various arithmetic operations.

The IC card offers high portability. The IC card can also communicate with an external apparatus. Moreover, the IC card can perform complicated arithmetic operations based on communicated data.

The IC card is characterized in that forging the IC card is difficult. For example, an IC card in which highly confidential information or the like is stored can be used for a security system or electronic commerce.

The above-described IC card stores various applications. Upon receiving a command from a reader and writer (card reader and writer) for the IC card through non-contact communication, the IC card executes an application corresponding to the received command. Thus, the IC card can achieve various functions.

However, when the IC card transmits and receives data to and from the card reader and writer, an error may occur in the data. That is, data transmitted by the transmitter fails to match data received by the receiver. Thus, for example, Japanese Patent No. 3607229 describes a portable electronic apparatus configured to add validation information to data to be transmitted.

The above-described portable electronic apparatus generates validation information from the characters in the data to be transmitted and adds the validation information to the transmission data. A processing apparatus for the IC card corresponding to a receiver generates the validation information from the characters in the received data. The processing apparatus then compares the received validation information with the generated validation information for validation. For example, IC cards conforming to the international standards ISO/IEC 14443 validate data using CRC or a hash.

The amount of data that can be transmitted during a single communication operation is predetermined. Thus, if a large amount of data needs to be transmitted, the IC card divides the data into a plurality of frames for transmission. The IC card generates validation information for each frame and adds the generated validation information to the transmission data.

Alternatively, the data stored in the IC card may itself be validated. In this case, data to which corresponding validation information is added behind the data is stored in the IC card. The validation information is generated based on pre-validated data. The IC card and the processing apparatus for the IC card generate validation information from the data and compare the generated validation information with the validation information added to the data for validation.

However, as described above, if the data transmitted by the IC card is too large to transmit during a single communication operation, the processing apparatus for the IC card receives the separated frames in order. Thus, disadvantageously, the processing apparatus for the IC card cannot determine whether or not validation information is present until the processing apparatus receives the frame containing the validation information.

BRIEF SUMMARY OF THE INVENTION

According to one embodiment of the invention, a processing system for a portable electronic apparatus, the portable electronic apparatus, and a processing apparatus for the portable electronic apparatus can be provided, all of which can efficiently execute processing.

A processing system, which is an embodiment of this invention, has a portable electronic apparatus and a processing apparatus of portable electronic apparatus, the portable electronic apparatus comprising: a first transmission and reception section configured to transmit and receive data to and from the processing apparatus; a first storage section configured to store information to be communicated to the processing apparatus and formats for a frame to be transmitted to the processing apparatus, in association with one another; and a control section configured to select one of the formats stored in the first storage section based on the data to be transmitted to the processing apparatus and to transmit the data to the processing apparatus using the selected format, and the processing apparatus comprises: a second transmission and reception section configured to transmit and receive data to and from the portable electronic apparatus; a second storage section configured to store information communicated by the portable electronic apparatus and the format of the frame transmitted by the portable electronic apparatus, in association with each other; and a recognition section configured to recognize information communicated by the portable electronic apparatus based on the format of the frame received from the portable electronic apparatus by the second transmission and reception section.

A portable electronic device, which is an embodiment of this invention, comprises: a transmission and reception section configured to transmit and receive data to and from the processing apparatus; a storage section configured to store information to be communicated to the processing apparatus and formats for a frame to be transmitted to the processing apparatus, in association with one another; and a control section configured to select one of the formats stored in the first storage section based on the data to be transmitted to the processing apparatus and to transmit the data to the processing apparatus using the selected format.

A portable electronic device, which is an embodiment of this invention, comprises: a transmission and reception section configured to transmit and receive data to and from the portable electronic apparatus; a storage section configured to store information communicated by the portable electronic apparatus and the format of the frame transmitted by the portable electronic apparatus, in association with each other; and a recognition section configured to recognize information communicated by the portable electronic apparatus based on the format of the frame received from the portable electronic apparatus by the transmission and reception section.

Thus, this invention can provide a processing system for a portable electronic apparatus, the portable electronic apparatus, and a processing apparatus for the portable electronic apparatus can be provided, all of which can efficiently execute processing.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

With reference to the drawings, description will be given below of a processing system for a portable electronic apparatus, the portable electronic apparatus, and a processing apparatus for the portable electronic apparatus according to an embodiment of the present invention.

Figure 1:
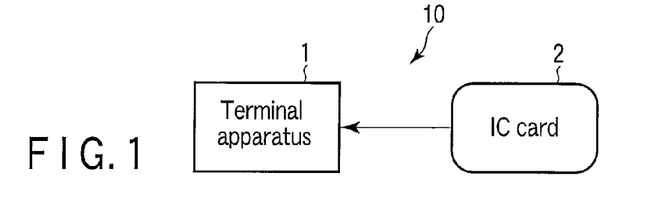
FIG. 1 is a block diagram illustrating an example of the configuration of a processing system for a portable electronic apparatus according to an embodiment of the present invention.

FIG. 1 is a block diagram illustrating an example of the configuration of an IC card processing system 10 according to the embodiment of the present invention.

The IC card processing system 10 shown in FIG. 1 comprises a processing apparatus (terminal apparatus) 1 for a portable electronic apparatus and the portable electronic device (IC card) 2. The terminal apparatus 1 and the IC card 2 transmit and receive data to and from each other by contact communication or non-contact communication. In the description, it is assumed that data is transmitted and received in accordance with the Type B communication protocol specified in the international standards ISO/IEC 14443.

Figure 2:
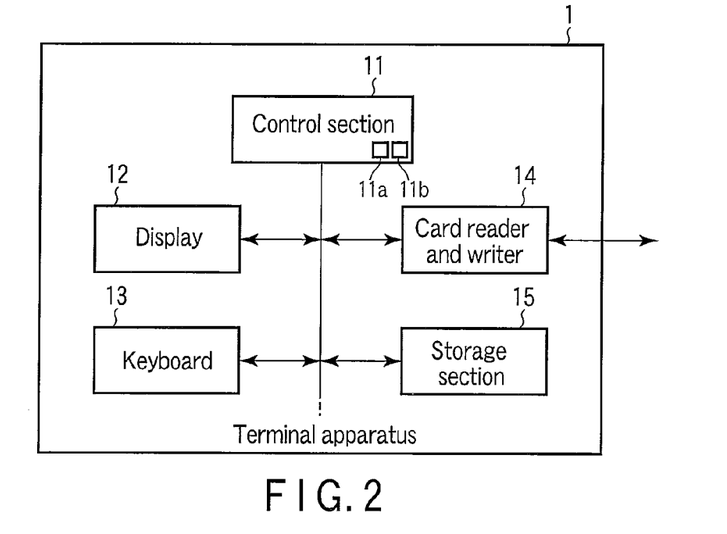
FIG. 2 is a block diagram illustrating an example of the configuration of a terminal apparatus shown in FIG. 1.

FIG. 2 is a block diagram illustrating an example of the configuration of the terminal apparatus shown in FIG. 1. As shown in FIG. 2, the terminal apparatus 1 includes a control section 11, a display 12, a keyboard 13, a card reader and writer 14, and a storage section 15.

The control section 11 comprises CPU, ROM, and RAM. The control section 11 controls the operation of the terminal apparatus 1 as a whole.

The display 12 displays various types of information under the control of the control section 11. The keyboard 13 receives operations input by an operator of the terminal apparatus 1 as operation signals.

The card reader and writer 14 is an interface device configured to allow communication with the IC card 2. The card reader and writer 14 supplies power and a clock to the IC card 2, controllably resets the IC card 2, and transmits and receives data to and from the IC card 2. That is, the card reader and writer 14 functions as a transmission and reception section.

The control section 11 allows the card reader and writer 14 to input various commands to the IC card 2. For example, upon receiving a data write command from the card reader and writer 14, the IC card 2 writes the received data to an internal nonvolatile memory.

Furthermore, upon receiving a data read command from the card reader and writer 14, the IC card 2 reads information specified by the received command from an internal memory and transmits the information to the card reader and writer 14. The control section 11 executes various types of processing based on the data received from the IC card 2.

The above-described card reader and writer 14 transmits and receives data to and from the IC card 2. For example, if the IC card 2 is configured as a non-contact portable electronic apparatus, the card reader and writer 14 comprises a signal processing section, a transmission and reception circuit, and an antenna.

The signal processing section encodes, decodes, modulates, and demodulates data transmitted to and received from the IC card 2. The transmission and reception circuit amplifies data modulated by the signal processing section and data received through the antenna.

The antenna transmits data to the IC card 2 by generating magnetic fields. Furthermore, the antenna recognizes the data transmitted by the IC card 2 based on an inductive current generated by electromagnetic induction.

The control section 11 sets communication with the IC card 2 by allowing the card reader and writer 14 to transmit an initialization command to the IC card 2. The initialization command is, for example, a start command or a select command. In order to sense the IC card 2, the card reader and writer 14 repeatedly transmits the start command (for example, a request command (REQB) and a wake up command (WUPB)) to a communication range.

If the IC card 2 is present within the communication range, an answer to the start command (for example, an answer to request (ATQB)) from the IC card 2 is returned to the card reader and writer 14. Thus, the card reader and writer 14 senses the IC card 2. Furthermore, the card reader and writer 14 transmits the select command (for example, an attribute command (ATTRIB)) configured to select the desired IC card 2. Upon receiving ATTRIB, the IC card 2 transmits an answer to ATTRIB (ATA), that is, a response to ATTRIB, to the card reader and writer 14. Thus, communication can be performed between the card reader and writer 14 and the IC card 2.

The card reader and writer 14 of the Type B applies a 10% amplitude modulation to a carrier of frequency 13.56 MHz based on data to be transmitted, and further encodes the carrier in accordance with a non return to zero (NRZ) scheme.

The IC card 2 of the Type B applies phase modulation and NRZ encoding to a subcarrier of frequency 847.5 KHz based on data to be transmitted.

Furthermore, the terminal apparatus 1 transmits a mutual authentication command to the IC card 2 as required. This allows a mutual authentication process to be executed.

The storage section 15 is a rewritable nonvolatile memory. The storage section 15 is configured to store control programs and various data depending on the operational purpose of the terminal apparatus 1.

The control section 11 comprises an additional-information table 11a. The additional-information table 11a is a storage section configured to store information communicated by the IC card 2 and the format of frames transmitted by the IC card 2 in association with each other. Before receiving data from the IC card 2, the control section 11 determines, with reference to the additional-information table 11a, whether or not any additional information is added to the received data and the type of the additional information. The additional-information table 11a will be described below.

Figure 3:
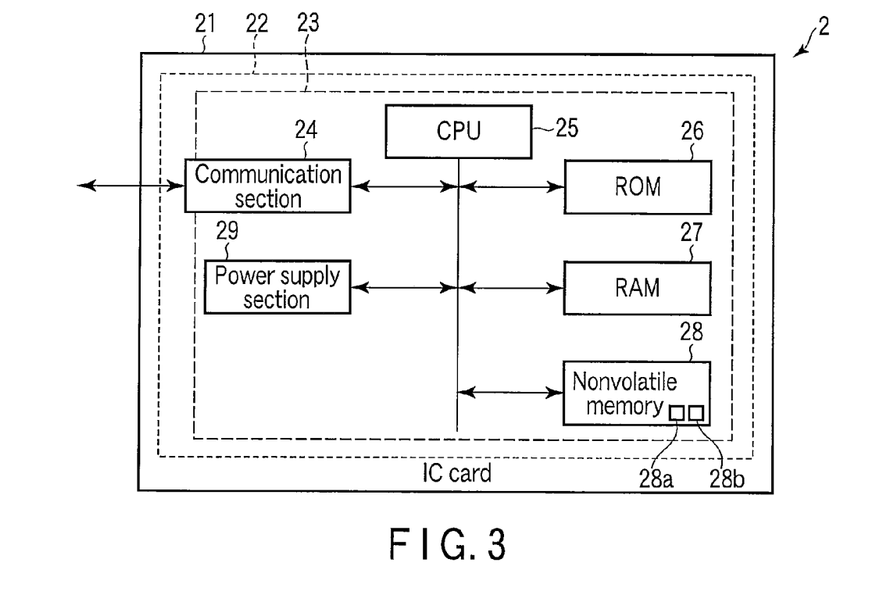
FIG. 3 is a block diagram illustrating an example of the configuration of an IC card shown in FIG. 1.

FIG. 3 is a block diagram illustrating an example of the configuration of the IC card 2 shown in FIG. 1.

As shown in FIG. 3, the IC card 2 comprises a card-like main body 21 and an IC module 22 incorporated in the main body 21. The IC module 22 comprises one or more IC chips 23 and a communication section 24. The IC chip 23 and the communication section 24 are formed in the IC module 22 so as to be connected together.

The IC chip 23 comprises the communication section 24, CPU 25, ROM 26, RAM 27, a nonvolatile memory 28, and a power supply section 29.

The communication section 24 is an interface configured to communicate with the card reader and writer 14 in the terminal apparatus 1. The communication section 24 functions as a transmission and reception section.

To communicate with the card reader and writer 14 in a non-contact manner, the communication section 24 comprises an antenna configured to communicate with the card reader and writer 14. Moreover, the communication section 24 comprises a transmission and reception circuit configured to amplify received data and a signal processing section configured to execute processing such as decoding and modulation.

CPU 25 functions as a control section configured to control the IC card 2 as a whole. CPU 25 executes various types of processing based on control programs and control data stored in ROM 26 or the nonvolatile memory 28. For example, CPU 25 executes various types of processing in accordance with commands received from the card reader and writer 14 to generate data such as responses as a result of the processing.

ROM 26 is a nonvolatile memory configured to pre-store the control programs and the control data. During manufacturing, ROM 26 in which the control programs and the control data are stored is incorporated into the IC card 2. That is, the control programs and control data stored in ROM 26 are pre-incorporated into the IC card 2 in accordance with the specifications of the IC card 2.

RAM 27 is a volatile memory functioning as a working memory. RAM 27 temporarily stores data being processed. For example, RAM 27 temporarily stores data received from the terminal apparatus 1 via the communication section 24.

Furthermore, RAM 27 temporarily stores programs to be executed by CPU 25.

The nonvolatile memory 28 functions as a storage section. The nonvolatile memory 28 comprises a nonvolatile memory to which data can be written and in which data can be rewritten, for example, EEPROM or flash ROM. The nonvolatile memory 28 stores control programs and various data in accordance with the operational purpose of the IC card 2.

For example, program files and data files are created in the nonvolatile memory 28. The control programs and various data are written to each of the created files. CPU 25 can achieve various types of processing by executing the programs stored in the nonvolatile memory 28 or ROM 26.

If the IC card is a non-contact portable electronic apparatus, the power supply section 29 generates power and an operation clock from a carrier from the card reader and writer 14. The power supply section 29 supplies the power and the operation clock to each section of the IC card 2. Upon being supplied with the power, each section of the IC card 2 becomes operative.

Figure 4:
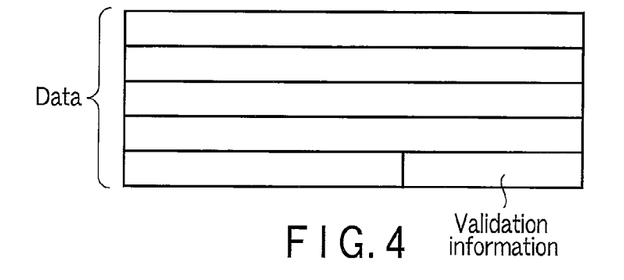
FIG. 4 is a diagram illustrating an example of data transmitted by the IC card shown in FIG. 3.
Figure 5:
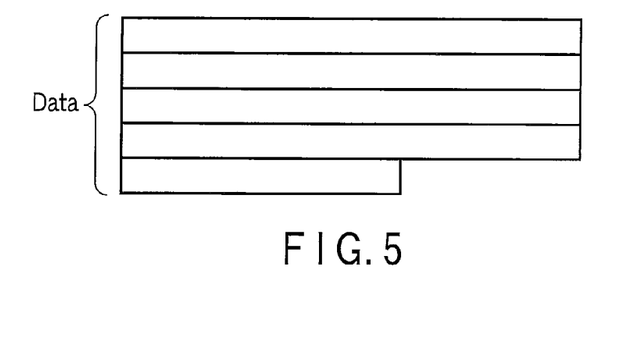
FIG. 5 is a diagram illustrating an example of the data transmitted by the IC card shown in FIG. 3.

FIGS. 4 and 5 are diagrams illustrating an example of data transmitted by the IC card 2 shown in FIG. 3.

FIG. 4 shows an example of data to which validation information is added. In the present example, a hash, a cyclic redundancy check (CRC), or the like is used as validation information used to validate data. The validation information is placed after the data bits. FIG. 5 shows an example of data to which no validation information is added.

To transmit data to the card reader and writer 14, the IC card 2 separates the data to be transmitted into sets each of a predetermined number of bits (for example, 8 bits). The IC card 2 adds a start bit set to logic "0" and a stop bit set to logic "1" to each group of a predetermined number of bits to generate a character. The IC card 2 adds a start of frame (SOF) and an end of frame (EOF) to the generated characters to generate a frame.

If a plurality of characters are transmitted in one frame, the characters are separated from each other with an extra guard time (EGT).

Furthermore, the IC card 2 calculates CRC from all the data bits in the generated frames and inserts CRC between EOS and the characters. The start bit, the stop bit, EGT, SOF, and EOF are not used to calculate CRC.

Figure 6:
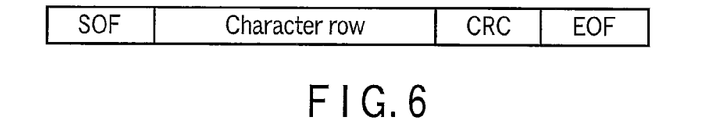
FIG. 6 is a diagram illustrating an example of the configuration a frame of the data transmitted by the IC card.

FIG. 6 is a diagram illustrating an example of the configuration of the frame of data transmitted by the IC card 2 shown in FIG. 3.

The frame comprises SOF, a character row, CRC, and EOF. CRC contained in the frame is information required to check the data before and after transmission for consistency. CRC is different from validation information required to validate the data itself.

Figure 7:
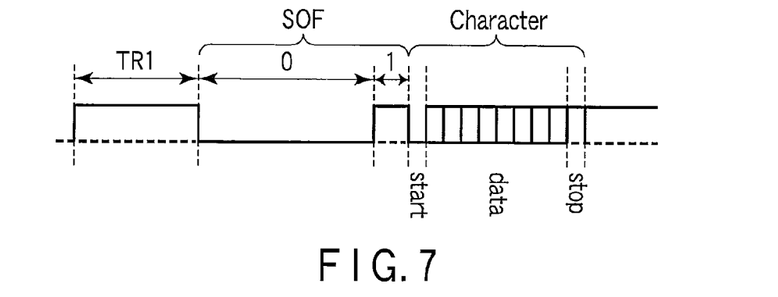
FIG. 7 is a diagram illustrating an example of the configuration of characters shown in FIG. 6.

FIG. 7 is a diagram illustrating an example of the configuration of SOF shown in FIG. 6.

SOF is information indicative of the head of the frame. SOF is a signal starting with a rising edge and having the state of logical "0" and the state of logical "1" each of which lasts a predetermined time. The IC card 2 transmits the above-described SOF to the card reader and writer before transmitting the first character in the frame. A subcarrier with no phase transition for a synchronization time (TR1) needs to be provided before SOF in order to allow the IC card 2 and the terminal apparatus 1 to synchronize with each other. The IC card 2 is controlled such that after generation of a subcarrier, the carrier is not modulated for a predetermined time. That is, TR1 is a duration from generation of a subcarrier until modulation is started.

Upon receiving a signal in the above-described form, the terminal apparatus 1 determines that SOF has been received. The terminal apparatus 1 then determines that the character row is to be transmitted by the IC card 2.

Figure 8:
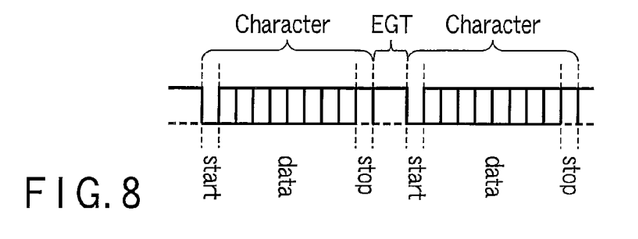
FIG. 8 is a diagram illustrating an example of the configuration of SOF in FIG. 6.

FIG. 8 is a diagram illustrating an example of the configuration of the character row shown in FIG. 6.

The character row is the main body of the data transmitted to the terminal apparatus 1 by the IC card 2. The character row comprises a plurality of characters. Each of the characters comprises a predetermined number of data bits, a start bit, and a stop bit. Furthermore, EGT, which is a bit set to logical "1" and having a predetermined length, is located between the characters.

The terminal apparatus 1 recognizes the data bits in the character based on the start bit and the stop bit. This allows the terminal apparatus 1 to individually recognize the data bits in the plurality of characters in the frame.

Figure 9:
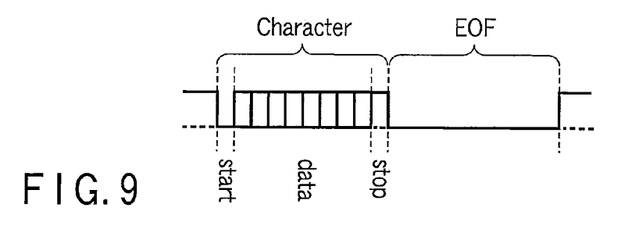
FIG. 9 is a diagram illustrating an example of the configuration of EOF in FIG. 6.

FIG. 9 is a diagram illustrating an example of the configuration of EOF shown in FIG. 6.

EOF is information indicative of the tail end of the frame. EOF is a signal starting with a rising edge and has the state of logical "0" lasting a predetermined time. After transmitting the final character in the frame, the IC card 2 transmits the above-described EOF to the card reader and writer 14.

Upon receiving a signal in the above-described form, the terminal apparatus 1 determines that EOF has been received and that one frame has been received.

The lengths of TR1, SOF, the characters, EGT, and EOF are determined based on the Type B specified in ISO/IEC 14443.

For example, when the frequency of the subcarrier is defined as fs, the length of TR1 is at least 80/fs and at most 200/fs.

Furthermore, when the time required to transmit 1-bit data is defined as an elementary time unit (etu), the length of logical "0" of SOF is at least 10 etu and at most 11 etu. Additionally, the length of logical "1" of SOF is at least 2 etu and at most 2 etu. That is, the length of the entire SOF is at least 12 etu and at most 14 etu.

Furthermore, in the character, the start bit is 1 etu, the data bits are 8 etu, and the stop bit is 1 etu. That is, the length of the character is 10 etu. If the IC card transmits data to the terminal apparatus 1, the length of EGT is at least 0 etu and at most 2 etu.

Furthermore, the length of logical "0" of EOF is at least 10 etu and at most 11 etu.

Before transmitting data to the card reader 14, CPU 25 in the IC card 2 first checks the configuration of the data to be transmitted. For example, CPU 25 determines whether or not additional information, for example, validation information, is added to the data to be transmitted. Moreover, CPU 25 checks the type of the additional information added to the data to be transmitted. If the additional information is validation information, CPU 25 determines whether the validation information is a CRC value or a hash value.

The CPU 25 determines the lengths of TR1, SOF, EGT, and EOF based on the presence or absence and type of additional information. Thus, as shown in FIG. 3, the nonvolatile memory 28 in the IC card 2 contains an additional-information table 28a in which the presence or absence and type of additional information are associated with the format of the frame. The additional-information table 28a is the same as the additional-information table 11a in the terminal apparatus 1.

Figure 10:
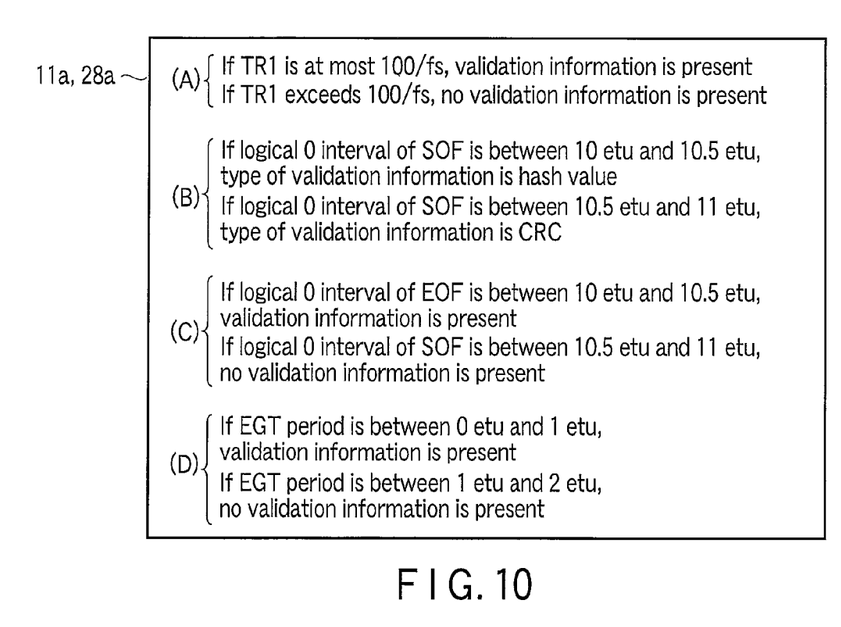
FIG. 10 is a diagram illustrating an additional-information table.

FIG. 10 is a diagram illustrating the additional-information tables 11a and 28a.

The IC card 2 checks the data to be transmitted for additional information. Then, with reference to the additional-information table 28a, the IC card 2 determines the format of the frames to be transmitted.

The control section 11 of the terminal apparatus 1 checks the format of the received data. Then, with reference to the additional-information table 11a, the control section 11 determines whether or not any additional information is present and the type of the additional information. That is, the control section 11 functions as a recognition section.

For example, to communicate the presence or absence and type of validation information to the terminal apparatus 1 in accordance with, for example, conditions shown in FIGS. 10(A) and 10(B), CPU 25 of the IC card 2 controls the lengths of TR1 and SOF. That is, if validation information is present, CPU 25 controllably sets the time for TR1 to shorter than 100/fs. If no validation information is present, CPU 25 controllably sets the time for TR1 to at least 100/fs.

If the validation information is a hash, CPU 25 controllably sets the interval of logical "0" of SOF to at least 10 etu and shorter than 10.5 etu. If the validation information is CRC, CPU 25 controllably sets the interval of logical "0" of SOF to at least 10.5 etu and at most 11 etu.

The control section 11 of the terminal apparatus 1 checks TR1 in the received data to determine whether or not validation information is present. For example, if TR1 in the received data is shorter than 100/fs, the control section 11 determines that validation information is present. That is, the control section 11 determines that the received data includes validation information. For example, if TR1 in the received data is at least 100/fs, the control section 11 determines that no validation information is present.

Moreover, upon determining that validation information is present, the control section 11 checks the interval of logical "0" of SOF and determines the type of the validation information. That is, if the interval of logical "0" of SOF in the received data is at least 10 etu and shorter than 10.5 etu, the control section 11 determines the validation information to be a hash. If the interval of logical "0" of SOF in the received data is at least 10.5 etu and at most 11 etu, the control section 11 determines the validation information to be CRC.

Furthermore, to communicate the presence or absence and type of validation information to the terminal apparatus 1 in accordance with, for example, conditions shown in FIGS. 10(C) and 10(D), CPU 25 of the IC card 2 controls the lengths of EOF and EGT. That is, if validation information is present, CPU 25 controllably sets the length of EOF to at least 10 etu and shorter than 10.5 etu. If no validation information is present, CPU 25 controllably sets the length of EOF to at least 10.5 etu and at most 11 etu.

If the validation information is a hash, CPU 25 controllably sets the length of EGT to at least 0 etu and shorter than 1 etu. If the validation information is CRC, CPU 25 controllably sets the length of EGT to at least 1 etu and at most 2 etu.

The control section 11 of the terminal apparatus 1 checks EOF in the received data to determine whether or not validation information is present. For example, if EOF in the received data is at least 10 etu and shorter than 10.5 etu, the control section 11 determines that validation information is present. That is, the control section 11 determines that the received data includes validation information. For example, if EOF in the received data is at least 10.5 etu and at most 11 etu, the control section 11 determines that no validation information is present.

Moreover, upon determining that validation information is present, the control section 11 checks the length of EGT to determine the type of the validation information. That is, if the length of EGT in the received data is at least 0 etu and shorter than 1 etu, the control section 11 determines the validation information to be a hash. If the length of EGT in the received data is at least 1 etu and at most 2 etu, the control section 11 determines the validation information to be CRC.

After receiving one frame, the control section 11 receives the next frame and performs an arithmetic operation process corresponding to the determined type of the validation information.

For example, if the validation information is a hash, the control section 11 calculates a hash value based on the data bits of each character in the received frame. On every reception of a frame, the control section 11 calculates a hash value. The control section 11 compares the hash value contained in the final frame with hash value calculated from the data bits to determine whether or not the received data is valid.

Furthermore, if the validation information is CRC, the control section 11 calculates a CRC value based on the data bits of each character in the received frame. On every reception of a frame, the control section 11 calculates a CRC value. The control section 11 compares the CRC value contained in the final frame with CRC value calculated from the data bits to determine whether or not the received data is valid.

Figure 11:
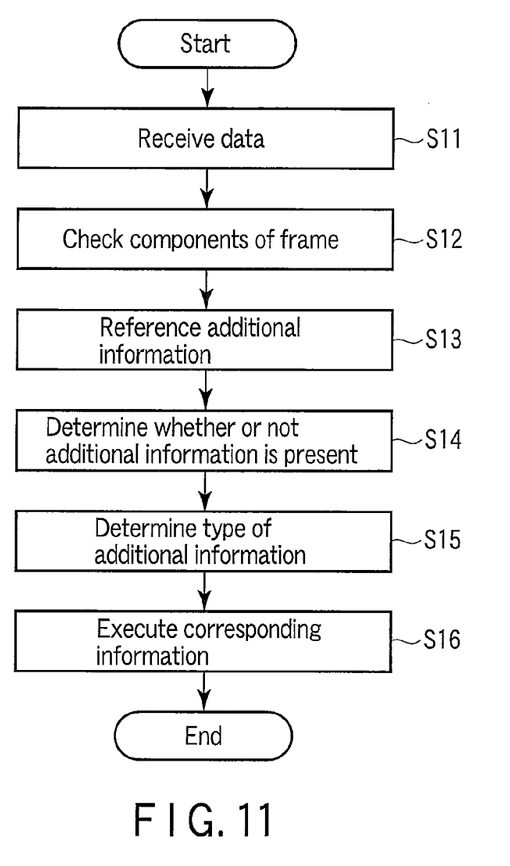
FIG. 11 is a flowchart illustrating processing executed by the terminal apparatus shown in FIG. 2.

FIG. 11 is a flowchart illustrating the operation of the terminal apparatus shown in FIG. 2.

When communication is established between the terminal apparatus 1 and the IC card 2, the terminal apparatus 1 transmits a processing command to the IC card 2. The IC card 2 executes processing in response to the received command. The IC card 2 further transmits a response to the terminal apparatus 1. The terminal apparatus 1 receives data transmitted by the IC card 2 (step S11).

For example, if the command transmitted to the IC card 2 is a data read command, the IC card 2 stores read data in characters in frames of the format shown in FIG. 6. The IC card 2 then transmits the frames to the terminal apparatus 1. In this case, with reference to the additional-information table 28a, the IC card 2 controls the lengths of TR1, SOF, EOF, and EGT of each of the frames in accordance with the additional information added to the data to be transmitted.

The terminal apparatus 1 checks each of the components of the frame in the received data (step S12). That is, the terminal apparatus 1 checks the length of each of TR1, SOF, EOF, and EGT.

The terminal apparatus 1 references the additional-information table 11a (step S13). Based on the length of each of TR1, SOF, EOF, and EGT of the frame, the terminal apparatus 1 determines whether or not additional information such as validation information is added to the succeeding frame (step S14).

Moreover, based on the length of each of TR1, SOF, EOF, and EGT of the frame, the terminal apparatus 1 determines the type of the additional information added to the succeeding frame (step S15).

The terminal apparatus 1 executes processing corresponding to the identified additional information (step S16). The terminal apparatus 1 thus finishes the processing on one frame. For example, if the additional information is a hash value or a CRC value, the terminal apparatus 1 executes a process of calculating a hash value or a CRC value from the data bits of the characters in the received frame. If the IC card 2 further transmits data, the terminal apparatus 1 receives the next frame.

As described above, the terminal apparatus 1 and IC card 2 according to the present embodiment comprises the additional-information table 11a and 28a, respectively. To transmit data to the terminal apparatus 1, the IC card 2 references the additional-information table 28a to control the format of frames to be transmitted depending on whether or not additional information is present and on the type of the additional information. With reference to the additional-information table 11a, the terminal apparatus 1 determines whether or not additional information is present and the type of the additional information based on the format of the received frames.

If data transmitted by the IC card 2 includes additional information and is divided into a plurality of frames, the terminal apparatus 1 can determine whether or not additional information is present and the type of the additional information upon receiving the first frame. Thus, the terminal apparatus 1 can start processing corresponding to the additional information upon receiving the first frame. As a result, the present embodiment can provide a processing system for a portable electronic apparatus, the portable electronic apparatus, and a processing apparatus for the portable electronic apparatus all of which can efficiently execute processing.

The time of 1 etu varies between a transmission rate and the frequency of the carrier. For example, if the transmission rate of the IC card 2 is 106 kbps, the IC card 2 transmits 1-bit data in eight clocks. If the transmission rate of the IC card 2 is 212 kbps, the IC card 2 transmits 1-bit data in four clocks. If the transmission rate of the IC card 2 is 424 kbps, the IC card 2 transmits 1-bit data in two clocks. If the transmission rate of the IC card 2 is 848 kbps, the IC card 2 transmits 1-bit data in one clock.

For example, if the transmission rate is 106 kbps or 212 kbps, the lengths of SOF, EOF, and EGT can be more precisely controlled. For example, if transmissions and receptions are performed at a transmission rate of 212 kbps, the intervals of logical "0" of SOF can be set to 10 etu, 10.25 etu, 10.5 etu, 10.75 etu, and 11 etu. In this case, four types of information can be expressed by the intervals of logical "0" of SOF.

Furthermore, the association of the format of the frames with the information indicating whether or not additional information is present and the type of the additional information is not limited to that according to the above-described embodiment. Any manner of association is possible provided that the association is established between the IC card 2 and the terminal apparatus 1.

Moreover, in the above-described embodiment, the IC card conforms to the Type B specified in ISO/IEC 14443. However, the present invention is not limited to this aspect. The present invention is applicable to any communication scheme provided that the format of transmitted data is redundant according to the communication scheme. The present invention is applicable to any other communication scheme, for example, a contact interface, the single wire protocol (SWP), or USB.

Furthermore, for example, if the IC card is compatible with a multi-interface, the interfaces can be operated in parallel. For example, if a plurality of interfaces operate at the same time, the IC card can control the format of transmitted data such that the card reader and writer can determine that the plurality of interfaces are in operation.

Furthermore, based on the format of the frames transmitted by the IC card 2, the terminal apparatus 1 can determine whether or not any error has occurred in the IC card 2.

During communication, for example, an error detecting code (EDC) error, a parity error, a CRC error, and the like may occur during communication.

As shown in FIG. 2, the terminal apparatus 1 comprises an error information table 11b. The error information table 11b is a storage section configured to store error information communicated by the IC card 2 and the format of frames transmitted by the IC cards 2 in association with each other. Furthermore, as shown in FIG. 3, the IC card 2 comprises an error information table 28b. The error information tables 11b and 28b correspond to each other.

To transmit data to the terminal apparatus 1, CPU 25 in the IC card 2 checks the data for errors. If an error has occurred, CPU 25 determines the type of the occurring errors. Moreover, with reference to the error information table 28b, CPU 25 controls the format of frames to be transmitted, depending on the determined type of the error.

Upon receiving data, the control section 11 of the terminal apparatus 1 checks the format of the received data. With reference to the error information table 11b, the control section 11 determines whether or not any error has occurred and the type of the error based on the determined format.

For example, the IC card 2 controls the format of a position in the frame such as TR1 which is close to the head of the frame depending on whether or not any error is present and the type of the error. Thus, the terminal apparatus 1 can determine whether or not any error is present and the type of the error before receiving all of the data in one frame.

Figure 12:
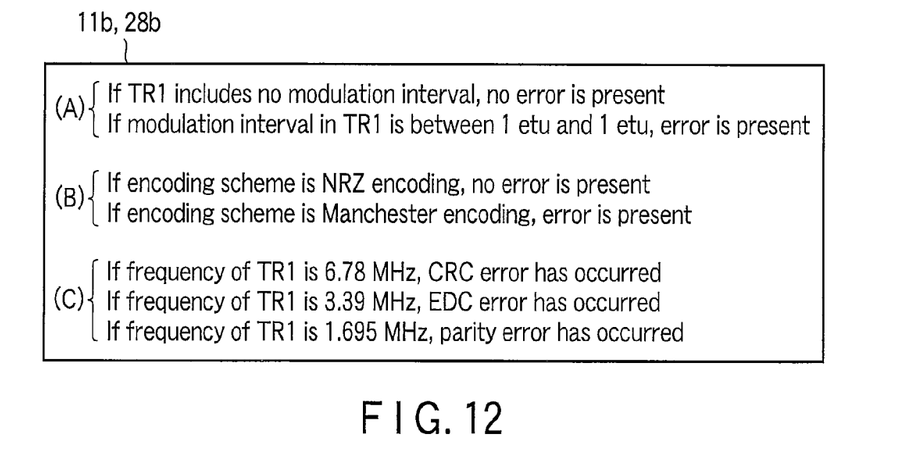
FIG. 12 is a diagram illustrating the error information tables.

FIG. 12 is a diagram illustrating the error information tables 11b and 28b.

Upon receiving a command from the terminal apparatus 1, the IC card 2 executes processing in response to the received command and creates response data. In this case, the IC card 2 determines whether or not any error is present and the type of the error during execution of processing on the received command or upon reception of the command. The IC card 2 references the error information table 28b based on the presence or absence of an error and the type of the error to control a signal for TR1 located in the front of the frame to be transmitted.

With reference to the error information table 11b, the terminal apparatus 1 determines whether or not any error is present and the type of the error based on the signal for TR1 in the front of the received data.

To communicate the presence or absence of an error to the terminal apparatus 1 in accordance with, for example, conditions shown in FIG. 12(A), CPU 25 in the IC card 2 indicates whether or not any error is present depending on whether or not to add a modulation interval to TR1. That is, if any error is present, CPU 25 adds a modulation interval of length at least 1 etu and at most 2 etu into the interval of TR1. If no error is present, CPU 25 controllably inhibits the carrier from being modulated all over the interval of TR1 as in the case of the conventional art.

The control section 11 of the terminal apparatus 1 checks TR1 in the received data to determine whether or not any error is present in the IC card 2. For example, if the interval of TR1 in the received data contains a modulation interval of length at least 1 etu and at most 2 etu, the control section 11 determines that an error has occurred in the IC card 2. If for example, the carrier is not modulated in any of the interval of TR1 in the received data, the control section 11 determines that no error has occurred in the IC card 2.

To communicate the presence or absence of an error to the terminal apparatus 1 in accordance with, for example, conditions shown in FIG. 12(B), CPU 25 in the IC card 2 indicates whether or not any error is present according to an encoding scheme for data frames to be transmitted. That is, if any error is present, CPU 25 encodes the data frames according to the Manchester encoding. If no error is present, CPU encodes the data frames according to the NRZ encoding as in the case of the conventional art.

The control section 11 of the terminal apparatus 1 checks the encoding scheme for the received data to determine whether or not any error is present in the IC card 2. For example, if the encoding scheme for the received data is the Manchester encoding, the control section 11 determines that an error has occurred in the IC card 2. For example, if the encoding scheme for the received data is the NRZ encoding scheme, the control section 11 determines that no error has occurred in the IC card 2.

Moreover, if any error has occurred, CPU 25 in the IC card 2 communicates the type of the error to the terminal apparatus 1 based on FIG. 12(C). For example, if the occurring error is a CRC error, CPU 25 controllably sets the frequency of the subcarrier to 6.78 MHz. If the occurring error is an EDC error, CPU 25 controllably sets the frequency of the subcarrier to 3.39 MHz. If the occurring error is a parity error, CPU 25 controllably sets the frequency of the subcarrier to 1.695 MHz.

The control section 11 of the terminal apparatus 1 checks the frequency of TR1 in the received data to determine the type of the error occurring in the IC card 2. For example, if the frequency of TR1 is close to 6.78 MHz, the control section 11 determines that a CRC error has occurred in the IC card 2. If the frequency of TR1 is close to 3.39 MHz, the control section 11 determines that an ERD error has occurred in the IC card 2. If the frequency of TR1 is close to 1.695 MHz, the control section 11 determines that a parity error has occurred in the IC card 2.

The control section 11 generates the next command to be transmitted to the IC card 2 based on the determined type of the error. In this case, the control section 11 shifts to processing on the next command before receiving all of the data in the frame.

If any error occurs in the conventional IC card 2, the IC card 2 transmits status information indicating that the error has occurred, to the card reader and writer 14. Upon receiving the error status information from the IC card 2, the card reader and writer 14 transmits the command to the IC card 2 again and re-executes the processing.

However, as described above, the IC card 2 according to the present embodiment controls the signal for the interval of TR1 or the like, which is close to the head of the frame, depending on whether or not any error is present and the type of the error. Based on the signal for TR1, the terminal apparatus 1 determines whether or not any error is present in the IC card 2 and the type of the error. Thus, the terminal apparatus 1 can determine whether or not any error is present and the type of the error before receiving all of the data in one frame.

As a result, the present embodiment can provide a processing system for a portable electronic apparatus, the portable electronic apparatus, and a processing apparatus for the portable electronic apparatus all of which can efficiently execute processing.

A precondition for the above-described embodiment is the Type B communication protocol. However, the present invention is not limited to this configuration. The present invention is applicable to any communication scheme provided that the communication scheme allows the format to be changed. The present invention is also applicable to contact communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processing system for an IC card comprising the IC card executing processing in response to a command, and a processing apparatus for the IC card, wherein the IC card comprises:
a first transmission and reception section configured to transmit and receive data of a frame that includes no phase transition time, start of frame, character, and end of frame to and from the processing apparatus;
a first storage section configured to store in association with information indicating whether validation information is added to the data to be communicated to the processing apparatus, length of the no phase transition time, or length of logical "0" of the start of frame; and a control section configured to control the length of the no phase transition time, or the length of logical "0" of the start of frame based on the data to be transmitted to the processing apparatus, and wherein the processing apparatus comprises:

a second transmission and reception section configured to transmit and receive data of a frame that includes no phase transition time, start of frame, character, and end of frame to and from the IC card;

a second storage section configured to store in association with information indicating whether validation information is added to the data communicated by the IC card, length of the no phase transition time, or length of logical "0" of the start of frame; and a recognition section configured to recognize information indicating whether validation information is added to the data communicated by the IC card, based on the length of the no phase transition time, or the length of logical "0" of the start of frame.

2. The processing system for the IC card according to claim 1, wherein the first storage section and the second storage section store in association with information indicating type of validation information added to the data length of the no phase transition time, or length of logical "0" of the start of frame, and the control section controls the length of the no phase transition time, or the length of logical "0" of the start of frame based on the type of the validation information is added to the data.

3. An IC card configured to execute processing in response to a command received from a processing apparatus, the portable processing apparatus comprising:

a transmission and reception section configured to transmit and receive data of a frame that includes no phase transition time, start of frame, character, and end of frame to and from the processing apparatus;

a storage section configured to store in association with information indicating whether validation information is added to the data to be communicated to the processing apparatus, or length of the no phase transition time, length of logical "0" of the start of frame; and a control section configured to control the length of the no phase transition time, the length of logical "0" of the start of frame, and the length of logical "0" of the end of frame, based on whether validation information is added to the data to be transmitted to the processing apparatus.

4. The IC card according to claim 3, further comprising:

an IC module comprising the transmission and reception section, the storage section, and the control section; and a main body in which the IC module is installed.

5. A processing apparatus configured to process an IC card and comprising:

a transmission and reception section configured to transmit and receive data of a frame that includes no phase transition time, start of frame, character, and end of frame to and from the IC card;

a storage section configured to store in association with information indicating whether validation information is added to the data communicated by the IC card, or length of the no phase transition time, length of logical "0" of the start of frame; and a recognition section configured to recognize information indicating whether validation information is added to the data communicated by the IC card, based on the length of the no phase transition time, or the length of logical "0" of the start of frame.

* * * * *